United States Patent Office.

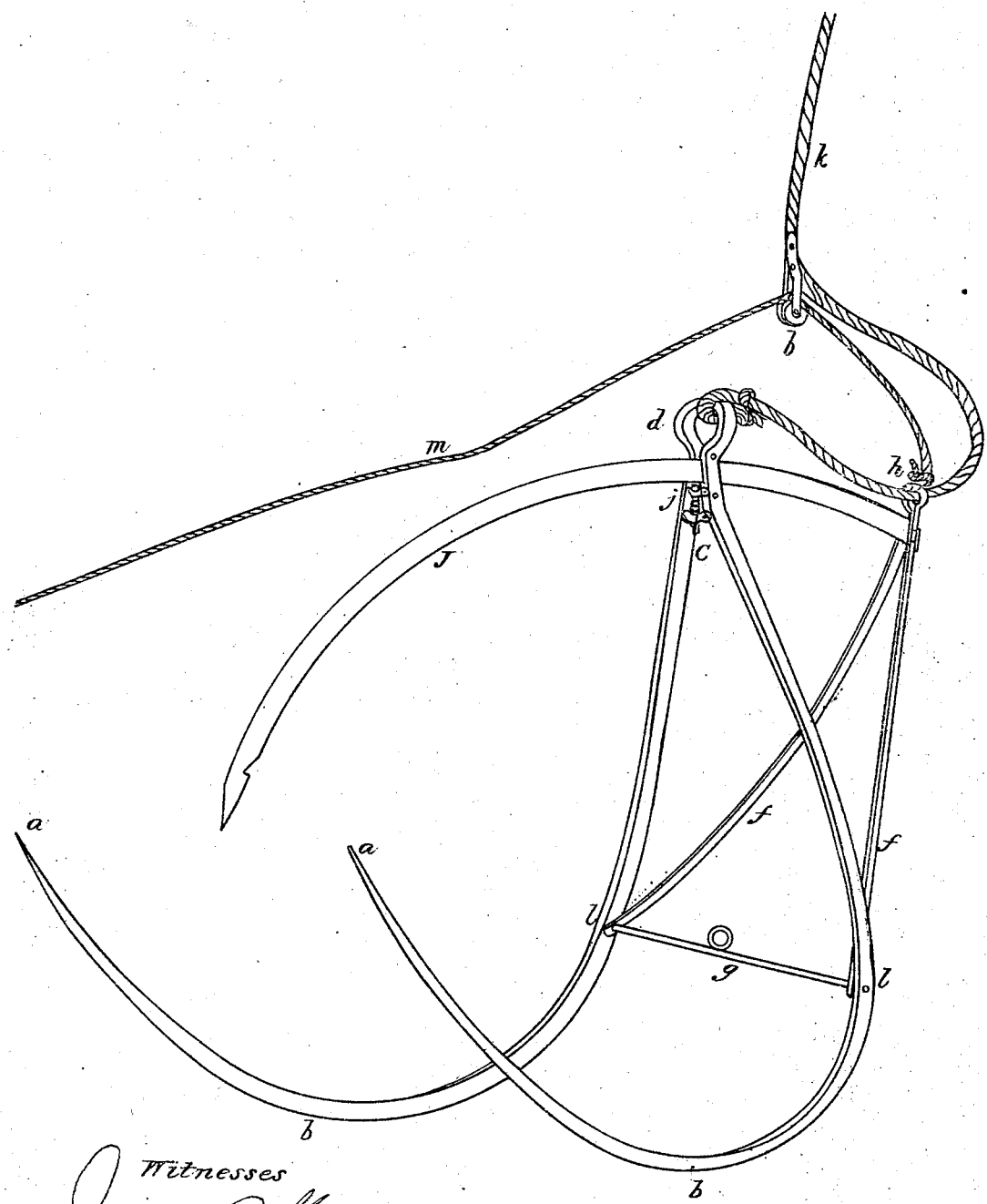

GEORGE H. WALDO, OF PRATTSBURG, NEW YORK.

Letters Patent No. 71,928, dated December 10, 1867.

---

IMPROVEMENT IN HORSE HAY-FORKS.

---

The Schedule referred to in these Letters Patent and making part of the same.

---

TO ALL WHOM IT MAY CONCERN:

Be it known that I, GEORGE H. WALDO, of Prattsburg, in the county of Steuben, and State of New York, have invented a new and improved Horse-Power Hay-Fork; and I do hereby declare that the following is a full and exact description thereof, reference being had to the accompanying drawing, and to the letters of reference marked thereon.

The object of my improvement is to combine strength, simplicity, utility, and convenience of operating, with the least weight and cost; also, the advantage of several methods of discharging the load without increasing the complication of the fork.

The head, eye, and tines of the fork are constructed of one bar of iron or steel, of suitable size, bent so as to form two hooks, one out of each half of the bar, and these, united, forming the head and eye. $a\,a$, in the accompanying drawing, represent the points of the tines, running nearly parallel to each other until near the bend $b\,b$, where they converge and at $c$ meet, and form the eye $d$. The points $e\,e$ are an equal distance from $d$, and such a distance that when the fork is suspended from them it will nearly balance, yet the centre of gravity falling on the side nearest the eye $d$. To these points are attached the extremities of the bail $f\,f$, by means of the rod $g$, having its extremities pass through the ends of the bail and through the fork, thus forming the hinges between the bail and fork; also a brace to the fork, to keep it to its proper shape. The rods $f\,f$ of the bail meet at a suitable distance from their points of attachment to the fork, and are united, and form the eye $h$ at the end. I is a rod, having one end attached to the bail, near the eye $h$, so that when it is closed up to the head of the fork this point will be opposite to the eye $d$. It is bent into a circling form, and the other end passed through the eye $d$, where it is also provided with two holes or notches, one near each end. To the head of the fork is attached a spring, J, on the side nearest the points of the tines, and so arranged that when the bail is opened away from the eye $d$, the rod I slides through the eye $d$ until the hole near the point of the rod I comes in contact with the spring J, which springs into it and holds it firm, which forms a handle to the fork as well as a bail. It is so constructed that the rod I can be detached from the bail, and also the bail from the fork, leaving only the rod $g$, and still work well, but without a handle. With these detached the operator takes the tines near the bow $b\,b$, and runs them into the hay by hand. The rope $k$, to which the horse is attached, has one end passed through the eye $h$, and fastened to the eye $d$ in some convenient way; and to the rope $k$ is attached a small pulley, $l$, as near the end of the rope as possible, and not have the eye $h$ come in contact with it when the bail is opened at its furthest extremity from the eye $d$. To the eye $h$ is fastened the cord $m$, passed through the small pulley $l$ to the operator, by which he discharges the load.

To work the fork, open the bail, so that the spring J will spring into the hole in the rod I nearest its point, which holds the bail fast, thus forming a handle to handle the fork with. Run the tines into the hay so that they will be opposite from where the hay is to be drawn, and the bail will be on the side of the fork toward where the hay is to go; then, as the horse draws on the rope $k$, the eye $d$ is drawn toward the eye $h$, and the rod I runs into the hay out of the way. To discharge the load, the operator holds the cord $m$ firm while the horse is drawing, which changes the draught from the eye $d$ to the bail, by means of the pulley $l$ and cord $m$, thus raising the tines out of the hay, and it drops to its desired place.

What I claim as my invention, and desire to secure by Letters Patent, is—

The tines $b\,b$, bail $f\,f$, curved holding-tine I, spring J, pulley $l$, rope $k$, all constructed and operated substantially as herein set forth.

In witness whereof, I have signed my name, in the presence of two subscribing witnesses.

GEO. H. WALDO.

Witnesses:
 F. A. SWENSON,
 A. K. SMITH.